United States Patent
Suzuki et al.

(10) Patent No.: US 6,784,396 B1
(45) Date of Patent: Aug. 31, 2004

(54) ELECTRIC DISCHARGE MACHINE FOR MAKING THIN HOLE

(75) Inventors: Satoshi Suzuki, Tokyo (JP); Akifusa Katagiri, Tokyo (JP); Hisao Yasuzumi, Tokyo (JP); Takashi Kanaya, Tokyo (JP); Toshio Moro, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/296,003

(22) PCT Filed: May 22, 2000

(86) PCT No.: PCT/JP00/03242
§ 371 (c)(1),
(2), (4) Date: Nov. 20, 2002

(87) PCT Pub. No.: WO01/89752
PCT Pub. Date: Nov. 29, 2001

(51) Int. Cl.[7] .............................. B23H 1/00; B23H 7/26
(52) U.S. Cl. .................................. 219/69.15; 219/69.11
(58) Field of Search ........................... 219/69.11, 69.15, 219/69.16, 69.2

(56) References Cited

U.S. PATENT DOCUMENTS 4,782,203 A  * 11/1988  Check et al. ............. 219/69.15
5,585,013 A  * 12/1996  Truty ....................... 219/69.12
5,951,883 A  *  9/1999  Barbulescu .............. 219/69.15
6,127,642 A  * 10/2000  Gleason et al. .......... 219/69.15
6,211,480 B1 *  4/2001  Nagata ..................... 219/69.11

FOREIGN PATENT DOCUMENTS

| DE | 19804371 A1 | * | 8/1998 | ............ B23H/1/00 |
| JP | 60-108234 A |   | 6/1985 | |
| JP | 63-39738 A  | * | 2/1988 | |
| JP | 5-177450 A  | * | 7/1993 | |
| JP | 8-229747 A  |   | 9/1997 | |

* cited by examiner

*Primary Examiner*—Geoffrey S. Evans
(74) *Attorney, Agent, or Firm*—Sughrue Mion, PLLC (57) ABSTRACT

An electrical discharge machine for forming a small hole including an intermediate guide having an upper guide and lower guide to support an electrode for forming a small hole at two points between an electrode holder and a small hole guide and also having a chuck, which can be opened and closed, provided in each guide; a first drive unit to drive the intermediate guide in the longitudinal direction of the electrode, a second drive unit to open and close the guide chucks of the intermediate guide; and a third drive unit to variably change distance L between the upper guide and lower guide of the intermediate guide in the longitudinal direction of the electrode.

8 Claims, 7 Drawing Sheets

ELECTRIC DISCHARGE MACHINE FOR MAKING THIN HOLE

TECHNICAL FIELD

The present invention relates to improvements in an electrical discharge machine for forming a small hole in a workpiece by electric discharge energy when electric power for machining is supplied to between the electrode for forming a small hole and the workpiece so as to form a small hole in the workpiece by the electric discharge energy.

BACKGROUND ART

An electrical discharge machine for forming a small hole is used for the purpose of forming a hole with high accuracy because roundness and uniformity of a hole formed by the electrical discharge machine are higher than those of a small hole formed by laser beam machining. In the case of forming a large number of small holes (for example, about 10,000 small holes, the diameter of which is 0.1 mm) in a workpiece, a highly reliable automatization is required.

Concerning the electrode for forming a small hole used for an electrical discharge machine, a thin wire made of copper or tungsten is used. Since the electrode for forming a small hole is intensely consumed in the process of electrical discharge machining, in order to prevent the productivity from deterioration, it is necessary to use a long electrode for forming a small hole (for example, the diameter of which is approximately 0.1 mm and the length of which is approximately 200 mm). Since the electrode for forming a small hole is very thin and long as described above, deflection tends to occur and it is difficult to handle the electrode. Therefore, when a small hole is formed with this electrode, problems occur in which the machining accuracy and reliability are deteriorated.

In order to stabilize the operation of machining by discharging sludge and also in order to enhance the roundness, for example, the electrode for forming a small hole is used while it is being rotated at a rotational speed of about 1,000 rpm. Therefore, deflection of the electrode for forming a small hole tends occur in the process of electrical discharge machining. When electric discharge machining is conducted under the condition that deflection is caused in the electrode for forming a small hole, there is a problem that a predetermined machining accuracy can not be obtained because it is impossible to appropriately conduct the feed of an electrode that is necessary in accordance with the detritions of the electrode.

Figure 6:
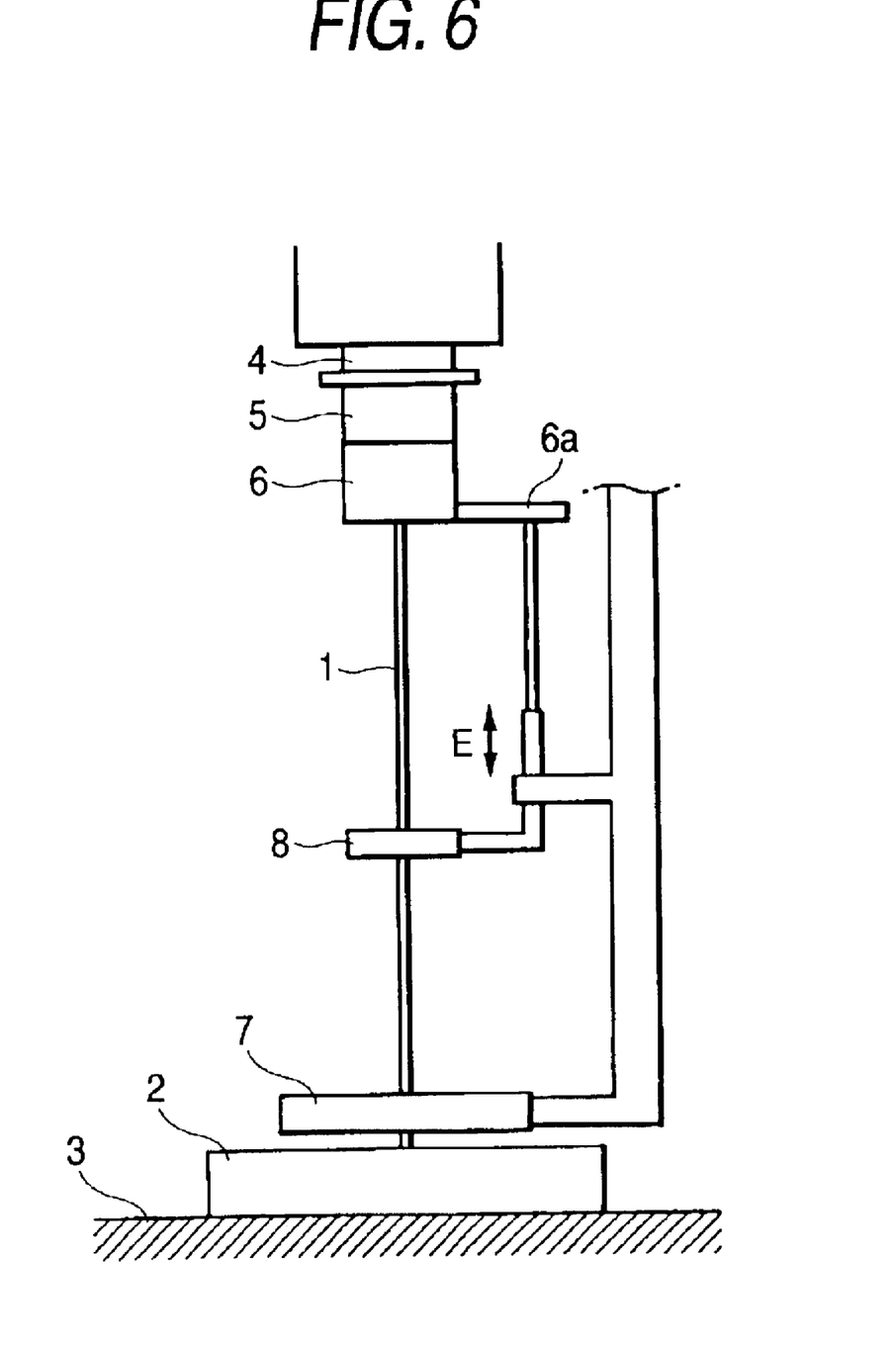
FIG. 6 is a schematic illustration showing a constitution of a conventional electrical discharge machine for forming a small hole.

FIG. 6 is a schematic illustration showing the constitution of a conventional electrical discharge machine for forming a small hole, which is disclosed in Japanese Unexamined Patent Publication No. 60-108234 aimed to solve the above problems. In the drawing, reference numeral 1 is an electrode for forming a small hole, reference numeral 2 is a workpiece, reference numeral 3 is a table, reference numeral 4 is a main shaft, reference numeral 5 is a chuck, reference numeral 6 is a an electrode holder for holding the electrode 1 for forming a small hole, reference numeral 6a is a support arm, reference numeral 7 is a small hole guide having a small hole by which the electrode 1 for forming a small hole is guided, and reference numeral 8 is an intermediate guide. Between the electrode 1 for forming a small hole and the workpiece 2, there is provided a work liquid not shown in the drawing. Electric power for electrical discharge machining is supplied from an electric power source not shown to between the electrode 1 for forming a small hole and the workpiece 2. Thus, a small hole is formed in the workpiece 2 by the electric discharge energy.

An intermediate portion of the electrode 1 for forming a small hole is guided by the intermediate guide 8, and this intermediate guide 8 is driven by the support arm 6a, so that the intermediate guide 8 can be moved synchronously with the elevation of the main shaft 4 (as shown by arrow E in the drawing). In this way, deflection of the electrode 1 for forming a small hole caused in the process of electrical discharge machining can be suppressed. However, this constitution has such a problem that it is difficult to automatically replace the electrode 1 for forming a small hole because of the structure in which the intermediate guide 8 is driven by the support arm 6. Further, it is impossible for the above intermediate guide 8 to meet the recent demand of enhancing the accuracy.

Figure 7:
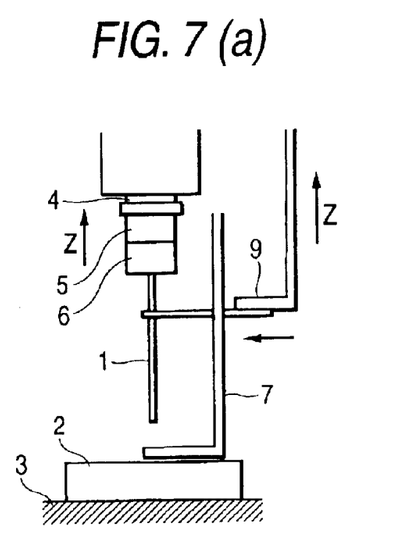
FIGS. 7(a) through 7(d) are schematic illustrations for explaining a constitution and operation of a conventional electrical discharge machine for forming a small hole.

FIG. 7 is a schematic illustration showing a constitution and operation of a conventional electrical discharge machine for forming a small hole disclosed in Japanese Unexamined Patent Publication No. 8-229747. In the drawing, reference numeral 1 is an electrode for forming a small hole, reference numeral 2 is a workpiece, reference numeral 3 is a table, reference numeral 4 is a main shaft, reference numeral 5 is a chuck, reference numeral 6 is a an electrode holder for holding the electrode 1 for forming a small hole, numeral 7 is a small hole guide, and reference numeral 9 is an introduction guide. There is provided a work liquid not shown between the electrode 1 for forming a small hole and the workpiece 2.

A primary object of this electrical discharge machine for forming a small hole is to automatically replace an electrode for forming a small hole. The summary of its operation will be described in the following items (1) to (4). (1) The main shaft 4 is raised, and the electrode 1 for forming a small hole is automatically replaced together with the electrode holder 6. After that, the induction guide 9 is raised to an upper portion of the electrode 1 for forming a small hole so as to loosely pinch the electrode 1 for forming a small hole as shown in FIG. 7(a); (2) While the electrode 1 for machining an small hole is being loosely pinched, the induction guide 9 is lowered to a lower portion of the electrode 1 for forming a small hole as shown in FIG. 7(b); (3) The main shaft 4 is lowered, and the electrode 1 for forming a small hole is inserted into a small hole of the small hole guide 7 as shown in FIG. 7(c); (4) The induction guide 9 is retracted outside the machining region of the workpiece 2 as shown in FIG. 7(d).

In the electrical discharge machine for forming a small hole having the above structure, it is possible to automatically replace the electrode for forming a small hole. However, it is impossible to suppress the occurrence of deflection of the electrode 1 for forming a small hole caused in the process of electrical discharge machining. Therefore, it is impossible to apply the electrical discharge machine for forming a small hole having the above structure to the use in which high accuracy is required.

DISCLOSURE OF THE INVENTION

In order to make rapid progress in science technology and strengthen industrial competitiveness in recent years, there is an increasing demand of enhancing the accuracy, productivity and reliability of an electrical discharge machine for forming a small hole. It is an object of the present invention to provide an electrical discharge machine for machining a highly accurate small hole, which is appropriate for automatization, by which the aforementioned problems are solved, being capable of enhancing accuracy, productivity and reliability.

An electrical discharge machine for forming a small hole of the present invention comprises: an electrode holder to hold an electrode for forming a small hole; a drive unit to drive the electrode holder and electrode for forming a small hole in the longitudinal direction; a small hole guide having a small hole to guide the electrode for forming a small hole, arranged close to a workpiece; and an electric power source used for electric discharge machining to supply electric power for electrical discharge machining between the electrode for forming a small hole and the workpiece, wherein a small hole is formed in the workpiece by electric discharge energy, and the electrical discharge machine for forming a small hole further comprises: an intermediate guide composed of at least two guides to hold the electrode for forming a small hole between the electrode holder and the small hole guide, each guide having a chuck capable of being opened and closed; a first drive unit to drive the intermediate guide in the longitudinal direction of the electrode for forming a small hole; a second drive unit to open and close the guide chucks of the intermediate guide; and a third drive unit to variably change a distance between the guides of the intermediate guide in the longitudinal direction of the electrode for forming a small hole.

An electrical discharge machine for forming a small hole of the present invention comprises: an electrode holder to hold an electrode for forming a small hole; a drive unit to drive the electrode holder and electrode for forming a small hole in the longitudinal direction; a small hole guide having a small hole to guide the electrode for forming a small hole, arranged close to a workpiece; and an electric power source used for electric discharge machining to supply electric power for electrical discharge machining between the electrode for forming a small hole and the workpiece, wherein a small hole is formed in the workpiece by electric discharge energy, and the electrical discharge machine for forming a small hole further comprises: an intermediate guide having a first guide to support the electrode for forming a small hole at a position close to the small hole guide and also having a second guide to support the electrode for forming a small hole at a position between the electrode holder and the small hole guide, the second guide having a chuck capable of being opened and closed; a first drive unit to drive the intermediate guide in the longitudinal direction of the electrode for forming a small hole; a second drive unit to open and close the chuck of the second guide of the intermediate guide; and a third drive unit to variably change a distance between the first and the second guide of the intermediate guide in the longitudinal direction of the electrode for forming a small hole.

An electrical discharge machine for forming a small hole of the present invention comprises: an electrode holder to hold an electrode for forming a small hole; a drive unit to drive the electrode holder and electrode for forming a small hole in the longitudinal direction; a small hole guide having a small hole to guide the electrode for forming a small hole, arranged close to a workpiece; and an electric power source used for electric discharge machining to supply electric power for machining between the electrode for forming a small hole and the workpiece, wherein a small hole is formed in the workpiece by electric discharge energy, and the electrical discharge machine for forming a small hole further comprises: an intermediate guide having a first guide to support the electrode for forming a small hole at a position close to the small hole guide and also having a plurality of guides except for the first guide to support the electrode for forming a small hole at positions between the electrode holder and the small hole guide, the plurality of guides except for the first guide having a chuck capable of being opened and closed; a first drive unit to drive the intermediate guide in the longitudinal direction of the electrode for forming a small hole; a second drive unit to open and close the chucks of the plurality of guides except for the first guide of the intermediate guide; and a third drive unit to variably change a distance between the first guide and each of the plurality of guides except for the first guide in the longitudinal direction of the electrode for forming a small hole.

An electrical discharge machine for forming a small hole of the present invention, further comprises a fourth drive unit to drive the small hole guide in the longitudinal direction of the electrode for forming a small hole.

An electrical discharge machine for forming a small hole of the present invention comprises a chuck capable of being opened and closed in the first guide of the intermediate guide.

BEST MODE FOR CARRYING OUT THE INVENTION

Embodiment 1

Figure 1:
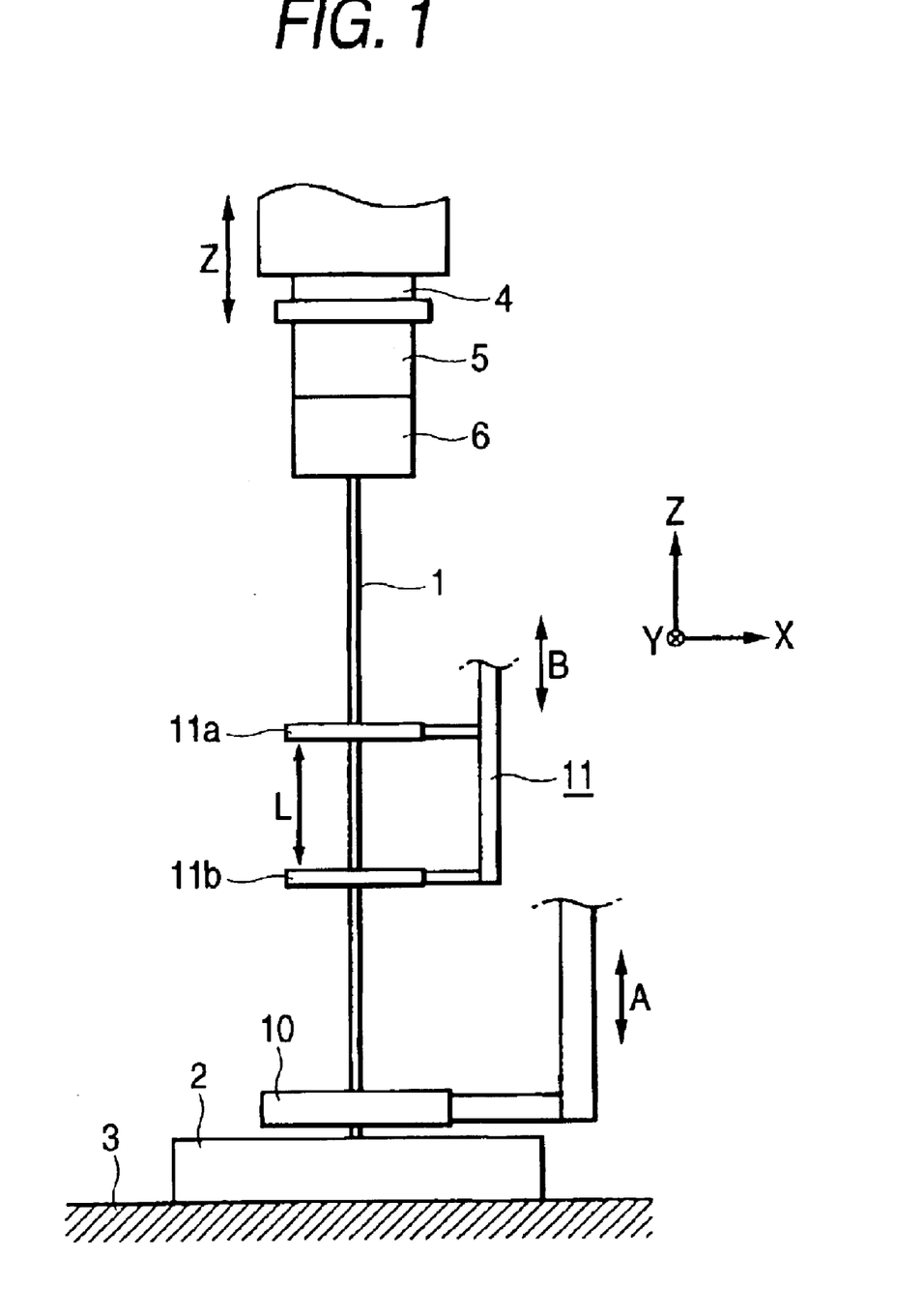
FIG. 1 is a schematic illustration showing a constitution of an electrical discharge machine for forming a small hole of Embodiment 1 of the present invention.

FIG. 1 is a schematic illustration showing a constitution of an electrical discharge machine for forming a small hole of Embodiment 1 of the present invention. In the drawing, reference numeral 1 is an electrode for forming a small hole, reference numeral 2 is a workpiece, reference numeral 3 is a table, reference numeral 4 is a main shaft, reference numeral 5 is a chuck, reference numeral 6 is a an electrode holder to hold the electrode 1 for forming a small hole, reference numeral 10 is a small hole guide having a small hole by which the electrode 1 for forming a small hole is guided, and reference numeral 11 is an intermediate guide, reference numeral 11*a* is an upper guide, and reference numeral 11*b* is a lower guide. Between the electrode 1 for forming a small hole and the workpiece 2, there is provided a work liquid not shown in the drawing. Electric power for electrical discharge machining is supplied from an electric power source not shown to between the electrode 1 for forming a small hole and the workpiece 2. Therefore, a small hole is formed in the workpiece 2 by electric discharge energy.

The main shaft 4 is driven by a drive unit not shown in the longitudinal direction of the electrode 1 for forming a small hole, that is, the main shaft 4 is driven in the direction shown by arrow Z in the drawing. For example, when the electrode 1 for forming a small hole is consumed, the main shaft 4 is lowered. The small hole guide 10 is driven by a drive unit not shown in the drawing in the longitudinal direction of the electrode 1 for forming a small hole corresponding to the thickness of the workpiece 2, that is, the small hole guide 10 is driven in the direction shown by arrow A in the drawing. Further, the intermediate guide 11 is driven by a drive unit not shown in the longitudinal direction of the electrode 1 for forming a small hole so that the electrode 1 for forming a small hole can be guided in the process of machining and also in the process of automatically replacing the electrode 1 for forming a small hole, that is, the intermediate guide 11 is driven in the direction of arrow B in the drawing.

The main shaft 4, small hole guide 10 and intermediate guide 11 can be respectively driven in directions Z, A and B by drive units in which an output of a servo motor is converted into a linear motion by a ball screw or a drive unit composed of a linear motor. In each drive unit, the linear motion can be supported by a linear guide mechanism such as a linear guide.

In the above constitution, the drive unit to drive the intermediate guide 11 may be composed on the drive unit to drive the small hole guide 10. Alternatively, the drive unit to drive the intermediate guide 11 may be composed independent from the drive unit to drive the small hole guide 10. In the case where the drive unit to drive the intermediate guide 11 is composed on the drive unit to drive the small hole guide 10, especially when the intermediate guide 11 is raised to a position close to the electrode holder 6 to hold an upper portion of the electrode 1 for forming a small hole in the case of automatically replacing the electrode 1 for forming a small hole, it is possible to utilize a stroke of the small hole guide 10 in direction A. Therefore, it is possible to reduce a stroke of the intermediate guide 11 in direction B.

Figure 2:
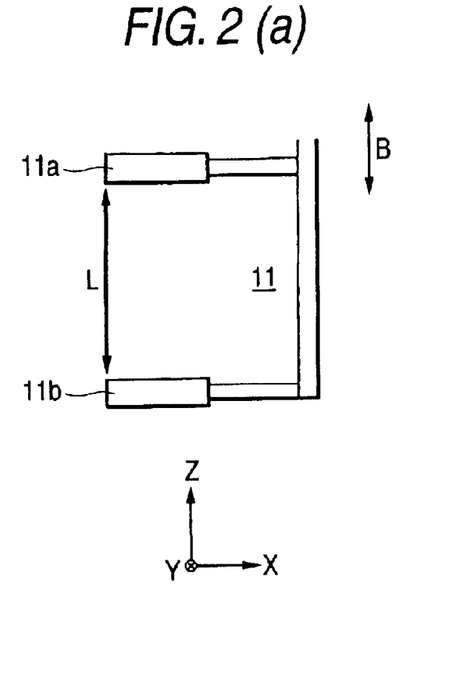
FIGS. 2(a) through 2(d) are schematic illustrations for explaining operation of an intermediate guide of an electrical discharge machine for forming a small hole of Embodiment 1 of the present invention.

FIG. 2 is a schematic illustration for explaining operation of the intermediate guide 11. Distance L between the upper guide 11a and lower guide 11b can be changed by a drive unit not shown in the drawing. For example, as shown in FIG. 2(b), it is possible to reduce distance L between the upper guide 11a and lower guide 11b in the direction of arrow C. As shown in FIGS. 2(c) and 2(d), the chucks 11c, 11d of the upper guide 11a and lower guide 11b are composed so that they can be opened and closed in the direction of arrow D by a drive unit not shown in the drawing.

In order to variably change distance L between the upper guide 11a and lower guide 11b of the intermediate guide 11 in direction C or direction opposite to direction C, the upper guide 11a and lower guide 11b can be driven by a drive unit in which an output of a servo motor is converted into a linear motion by a ball screw, a drive unit composed of a linear motor or a drive unit driven by an air cylinder. The chucks 11c, 11d of the intermediate guide 11 can be opened and closed being driven in direction D by a drive unit composed of an air cylinder. A linear motion in each drive unit can be supported by a linear guide mechanism such as a linear guide.

As shown in FIG. 1, the intermediate guide 11 supports the electrode 1 for forming a small hole at two points by the upper guide 11a and lower guide 11b, which are distant from each other by distance L in the vertical direction, in the process of machining a small hole. Therefore, deflection of the electrode 1 for forming a small hole, which is difficult to be handled because deflection tends to be caused in the electrode 1, can be positively suppressed.

Figure 3:
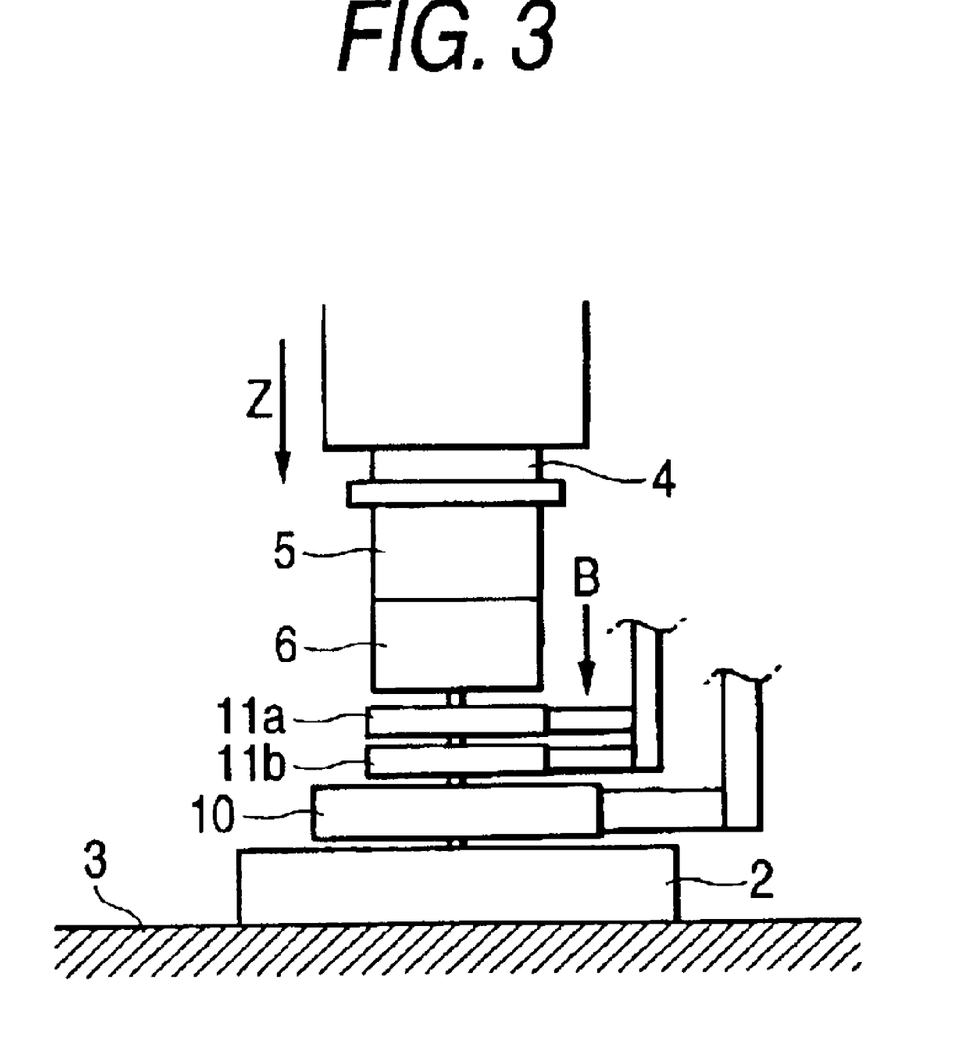
FIG. 3 is a schematic illustration for explaining operation of an intermediate guide of an electrical discharge machine for forming a small hole of Embodiment 1 of the present invention in the case where most of the electrode for forming a small hole is consumed.

Even when the electrode 1 for forming a small hole is consumed and the main shaft 4, chuck 5 and electrode holder 6 are lowered, for example, as shown in FIG. 3, an interval between the upper guide 11a and lower guide 11b of the intermediate guide 11 is reduced, and the upper guide 11a and lower guide 11b are arranged close to the small hole guide 10. Due to the foregoing, the upper guide 11a and lower guide 11b do not interfere with the electrode holder 6. Therefore, the electrode 1 for forming a small hole is not wasted, that is, the electrode 1 for forming a small hole can be effectively used.

Figure 4:
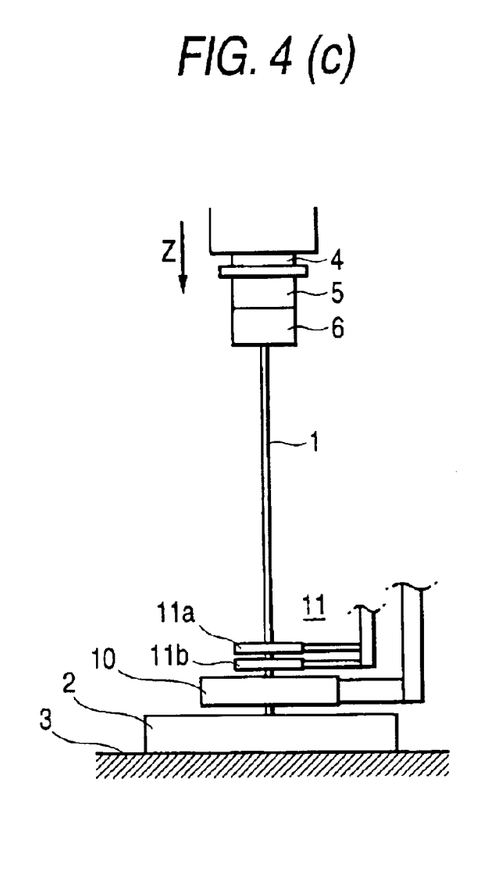
FIGS. 4(a) through 4(c) are schematic illustrations showing automatic replacing operation of the electrode for forming a small hole of an electrical discharge machine for forming a small hole of Embodiment 1 of the present invention.

FIG. 4 is a schematic illustration for explaining an automatic replacing operation of replacing the electrode 1 for forming a small hole. The operation will be briefly described in the following items (1) to (3).

(1) The electrode holder 6 and electrode 1 for forming a small hole are detached from the chuck 5 by an arm used for automatic replacement which is not shown in the drawing. After that, the intermediate guide 11 is raised. In the case where the electrode holder 6 is attached, the intermediate guide 11 is raised to a position close to the electrode holder 6. While the chucks of the intermediate guide 11 are being opened, for example, while the chucks 11c, 11d shown in FIG. 2 are being opened, the electrode 1 for forming a small hole is attached to the chuck 5 together with the electrode holder 6 by an arm used for automatic replacement which is not shown in the drawing. After that, the chuck of the intermediate guide 11 is closed and the electrode 1 for forming a small hole is loosely pinched by the chuck as shown in FIG. 4(a).

(2) While the electrode 1 for forming a small hole is being loosely pinched by the chuck, the intermediate guide 11 is lowered to a lower portion of the electrode 1 for forming a small hole as shown in FIG. 4(b).

(3) The main shaft 4 is lowered and the electrode 1 for forming a small hole is inserted into a small hole of the small hole guide 10 as shown in FIG. 4(c). As described in the above item (1), the intermediate guide 11 is raised, and the chuck of the intermediate guide 11 is opened. Under the above state, the electrode 1 for forming a small hole is attached. An upper portion, which is located as upward as possible, of this electrode 1 for forming a small hole is put into the chuck of the intermediate guide 11, and then the chuck of the intermediate guide 11 is closed. Therefore, the electrode 1 for forming a small hole, which is difficult to be handled because deflection tends to be caused, can be positively held at an upper portion which is located as upward as possible. Further, as described in the above items (2) and (3), the electrode 1 for forming a small hole can be positively guided and inserted into a small hole of the small hole guide 10. Therefore, the reliability of automatization can be enhanced.

As described above, according to the electrical discharge machine for forming a small hole of Embodiment 1 of the present invention, it is possible to positively suppress deflection of the electrode 1 for forming a small hole in the process of electrical discharge machining, and an automatic replacement of the electrode 1 for forming a small hole can be positively conducted. Accordingly, the accuracy, productivity and reliability can be enhanced.

Embodiment 2

Figure 5:
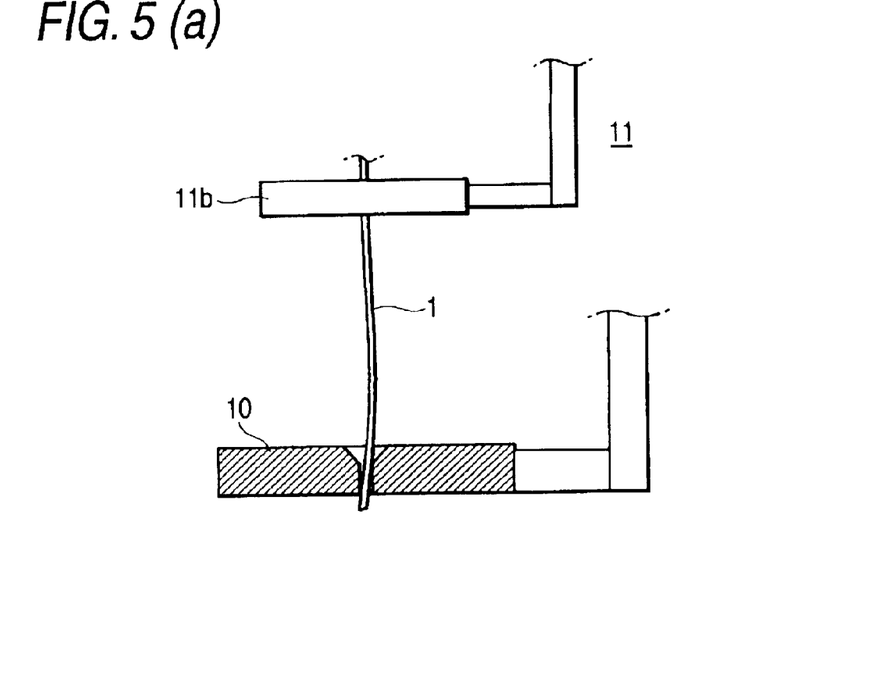
FIGS. 5(a) and 5(b) are schematic illustrations for explaining operation of an electrical discharge machine for forming a small hole of Embodiment 2 of the present invention.

FIG. 5 is a schematic illustration for explaining operation of an electrical discharge machine for forming a small hole of Embodiment 2 of the present invention. The constitution of the electrical discharge machine for forming a small hole of this embodiment is the same as that of Embodiment 1.

Even when an intermediate portion of the electrode 1 for forming a small hole is supported at two points by the intermediate guide 11 like Embodiment 1, for example, when the lower guide 11b of the intermediate guide 11 is distant from the small hole guide 10 as shown in FIG. 5(a), there is a possibility that a forward end portion of the electrode 1 for forming a small hole is inclined after it has passed through the small hole guide 10 and the machining accuracy is deteriorated. In this case, as shown in FIG. 5(b), when the lower guide 11b is arranged close to the small hole guide 10, an inclination of the forward end portion of the electrode 1 for forming a small hole, which is caused after the electrode 1 for forming a small hole has passed through the small hole guide 10, can be suppressed. Even in this case, when the upper guide 11a of the intermediate guide 11 supports an intermediate portion of the electrode 1 for forming a small hole, it becomes possible to suppress deflection of the electrode 1 for forming a small hole.

When the lower guide 11b of the intermediate guide 11 is arranged close to the small hole guide 10 and the upper guide 11a of the intermediate guide 11 is arranged so that it can support an intermediate portion of the electrode 1 for forming a small hole as described above, an enhancement of the accuracy can be realized.

In the above explanations, there is shown a case in which the intermediate guide 11 id composed of two guides, one is the upper guide 11a and the other is the lower guide 11b, and a distance between the upper guide 11a and the lower guide 11b is variable. However, the intermediate guide 11 may be composed of guides, the number of which is not less than three, and the distance between the guides of which can be changed. When the support points to support the electrode 1 for forming a small hole is increased, it becomes possible to positively suppress deflection of the electrode 1 for forming a small hole which is difficult to be handled because deflection tends to be caused.

INDUSTRIAL APPLICABILITY

As described above, the electrical machine for forming a small hole of the present invention is appropriately used for a highly precise small hole machining work.

What is claimed is:

1. An electrical discharge machine for forming a small hole comprising: an electrode holder to hold an electrode for forming a small hole; a drive unit to drive the electrode holder and electrode for forming a small hole in the longitudinal direction; a small hole guide having a small hole to guide the electrode for forming a small hole, arranged close to a workpiece; and an electric power source used for electric discharge machining to supply electric power for electrical discharge machining between the electrode for forming a small hole and the workpiece, wherein a small hole is formed in the workpiece by electric discharge energy, the electrical discharge machine for forming a small hole further comprising:

an intermediate guide composed of at least two guides to hold the electrode for forming a small hole between the electrode holder and the small hole guide, each guide having a chuck capable of being opened and closed;

a first drive unit to drive the intermediate guide in the longitudinal direction of the electrode for forming a small hole;

a second drive unit to open and close the guide chucks of the intermediate guide; and a third drive unit to variably change a distance between the guides of the intermediate guide in the longitudinal direction of the electrode for forming a small hole.

2. An electrical discharge machine for forming a small hole according to claim 1 further comprising: a fourth drive unit to drive the small hole guide in the longitudinal direction of the electrode for forming a small hole.

3. An electrical discharge machine for forming a small hole comprising: an electrode holder to hold an electrode for forming a small hole; a drive unit to drive the electrode holder and electrode for forming a small hole in the longitudinal direction; a small hole guide having a small hole to guide the electrode for forming a small hole, arranged close to a workpiece; and an electric power source used for electric discharge machining to supply electric power for electrical discharge machining between the electrode for forming a small hole and the workpiece, wherein a small hole is formed in the workpiece by electric discharge energy, the electrical discharge machine for forming a small hole further comprising:

an intermediate guide having a first guide to support the electrode for forming a small hole at a position close to the small hole guide and also having a second guide to support the electrode for forming a small hole at a position between the electrode holder and the small hole guide, the second guide having a chuck capable of being opened and closed;

a first drive unit to drive the intermediate guide in the longitudinal direction of the electrode for forming a small hole;

a second drive unit to open and close the chuck of the second guide of the intermediate guide; and a third drive unit to variably change a distance between the first and the second guide of the intermediate guide in the longitudinal direction of the electrode for forming a small hole.

4. An electrical discharge machine for forming a small hole according to claim 3 further comprising: a fourth drive unit to drive the small hole guide in the longitudinal direction of the electrode for forming a small hole.

5. An electrical discharge machine for forming a small hole according to claim 3, wherein the first guide of the intermediate guide is provided with a chuck capable of being opened and closed.

6. An electrical discharge machine for forming a small hole comprising: an electrode holder to hold an electrode for forming a small hole; a drive unit to drive the electrode holder and electrode for forming a small hole in the longitudinal direction; a small hole guide having a small hole to guide the electrode for forming a small hole, arranged close to a workpiece; and an electric power source used for electric discharge machining to supply electric power for machining between the electrode for forming a small hole and the workpiece, wherein a small hole is formed in the workpiece by electric discharge energy, the electrical discharge machine for forming a small hole further comprising:

an intermediate guide having a first guide to support the electrode for forming a small hole at a position close to the small hole guide and also having a plurality of guides except for the first guide to support the electrode for forming a small hole at positions between the electrode holder and the small hole guide, the plurality of guides except for the first guide having a chuck capable of being opened and closed;

a first drive unit to drive the intermediate guide in the longitudinal direction of the electrode for forming a small hole;

a second drive unit to open and close the chucks of the plurality of guides except for the first guide of the intermediate guide; and a third drive unit to variably change a distance between the first guide and each of the plurality of guides except for the first guide in the longitudinal direction of the electrode for forming a small hole.

7. An electrical discharge machine for forming a small hole according claim 6, further comprising a fourth drive unit to drive the small hole guide in the longitudinal direction of the electrode for forming a small hole.

8. An electrical discharge machine for forming a small hole according to claim 6, wherein the first guide of the intermediate guide has a chuck capable of being opened and closed.

* * * * *